US009821417B2

(12) United States Patent
Neumann et al.

(10) Patent No.: US 9,821,417 B2
(45) Date of Patent: Nov. 21, 2017

(54) SYSTEM AND METHOD FOR REPLACING A PITCH BEARING

(71) Applicant: General Electric Company, Schenectady, NY (US)

(72) Inventors: Ulrich Werner Neumann, Simpsonville, SC (US); Adam S. Davis, Livermore, CO (US); Gaylon Mitchell Pfeiffer, Tampa, FL (US); Michael R. Johnson, Campton, NH (US); Forrest Christopher Hach, Lake Benton, MN (US); Kevin Costain, Baltic, SD (US); Stephanie Willman, Greenville, SC (US); Theodore Steven Wilmot, Laurens, SC (US)

(73) Assignee: General Electric Company, Schenectady, NY (US)

( * ) Notice: Subject to any disclaimer, the term of this patent is extended or adjusted under 35 U.S.C. 154(b) by 216 days.

(21) Appl. No.: 14/706,458

(22) Filed: May 7, 2015

(65) Prior Publication Data

US 2016/0327017 A1 Nov. 10, 2016

(51) Int. Cl.
*B23P 6/00* (2006.01)
*B66D 1/00* (2006.01)
(Continued)

(52) U.S. Cl.
CPC .................. *B23P 6/00* (2013.01); *B66D 1/00* (2013.01); *F03D 1/0658* (2013.01); *F03D 13/10* (2016.05);
(Continued)

(58) Field of Classification Search
CPC ........ F03D 1/003; F03D 1/001; F03D 1/0658; F05B 2230/61; B23P 6/00; B66D 1/00; B66D 2700/026
(Continued)

(56) References Cited

U.S. PATENT DOCUMENTS 7,207,777 B2 * 4/2007 Bervang ................. B66C 1/108
416/119
7,353,603 B2 4/2008 Wobben
(Continued)

FOREIGN PATENT DOCUMENTS

CA 2692705 8/2010
EP 2345811 B1 10/2012
(Continued)

OTHER PUBLICATIONS

Related U.S. Appl. No. 14/480,656, filed Sep. 9, 2014.

*Primary Examiner* — Jacob Cigna
(74) *Attorney, Agent, or Firm* — Dority & Manning, P.A.

(57) ABSTRACT

The present disclosure is directed to systems and methods for removing or installing a pitch bearing of a wind turbine. The method includes installing a first pulley block at an up-tower location of the wind turbine and configuring a second pulley block with the pitch bearing. A pulley cable is routed from a ground location over the first pulley block to the second pulley block such that the second pulley block is configured to slide along the pulley cable. The method also includes rotating the pitch bearing to a tilted position. Thus, the method further includes lowering or lifting the pitch bearing in the tilted position so as to prevent the pitch bearing from colliding with the tower.

18 Claims, 16 Drawing Sheets

(51) Int. Cl.
*F03D 1/06* (2006.01)
*F03D 13/10* (2016.01)
*F03D 80/50* (2016.01)

(52) U.S. Cl.
CPC ........ *F03D 80/50* (2016.05); *B66D 2700/026* (2013.01); *F05B 2230/61* (2013.01); *Y02E 10/721* (2013.01); *Y02P 70/523* (2015.11)

(58) Field of Classification Search
USPC ........................................................ 254/264
See application file for complete search history.

(56) References Cited

U.S. PATENT DOCUMENTS

| | | |
|---|---|---|
| 7,735,290 B2 | 6/2010 | Arsene |
| 7,785,073 B2 | 8/2010 | Wobben |
| 7,832,101 B2 | 11/2010 | Koesters |
| 7,877,934 B2 | 2/2011 | Livingston et al. |
| 8,033,791 B1 | 10/2011 | Watanabe |
| 8,052,396 B2 | 11/2011 | Wobben |
| 8,069,634 B2 | 12/2011 | Livingston et al. |
| 8,083,212 B2 | 12/2011 | Numajiri et al. |
| 8,118,552 B2 * | 2/2012 | Nies .................. F03D 1/003 416/1 |
| 8,191,253 B2 | 6/2012 | Vangsy |
| 8,240,962 B2 | 8/2012 | Livingston et al. |
| 8,360,398 B2 | 1/2013 | Diaz De Corcuera et al. |
| 8,528,735 B2 | 9/2013 | Nies |
| 8,562,302 B2 | 10/2013 | Bakhuis et al. |
| 8,584,355 B2 | 11/2013 | Holling |
| 8,595,931 B2 | 12/2013 | Riddell et al. |
| 8,602,700 B2 | 12/2013 | Johnson |
| 8,651,462 B2 | 2/2014 | Van Berlo et al. |
| 2007/0266538 A1 | 11/2007 | Bervang |
| 2007/0290426 A1 * | 12/2007 | Trede ................ F03D 1/001 269/1 |
| 2009/0167023 A1 | 7/2009 | Nies |
| 2010/0018055 A1 | 1/2010 | Lynderup et al. |
| 2010/0028152 A1 | 2/2010 | Numajiri et al. |
| 2010/0135797 A1 * | 6/2010 | Nies .................. F03D 1/003 416/9 |
| 2010/0139062 A1 | 6/2010 | Reed et al. |
| 2010/0254813 A1 | 10/2010 | Dawson et al. |
| 2011/0142636 A1 | 6/2011 | Curtin |
| 2012/0027561 A1 | 2/2012 | Riddell et al. |
| 2012/0076663 A1 | 3/2012 | From |
| 2012/0137481 A1 | 6/2012 | Lindberg et al. |
| 2012/0217089 A1 | 8/2012 | Fenger |
| 2013/0025113 A1 | 1/2013 | Arocena De La Rua et al. |
| 2013/0074335 A1 | 3/2013 | Amano |
| 2013/0098859 A1 | 4/2013 | Soe et al. |
| 2013/0236316 A1 | 9/2013 | Bitsch et al. |
| 2013/0236324 A1 | 9/2013 | Bech et al. |
| 2013/0318789 A1 | 12/2013 | Gabeiras et al. |
| 2014/0010658 A1 * | 1/2014 | Nielsen ................ B66C 1/108 416/204 R |
| 2014/0010661 A1 * | 1/2014 | Hancock ................ F03D 1/003 416/207 |
| 2015/0226179 A1 * | 8/2015 | Neumann ............... F03D 1/003 29/889.1 |
| 2016/0327017 A1 * | 11/2016 | Neumann ............... F03D 1/003 |
| 2017/0045030 A1 * | 2/2017 | Senthoorpandian .... B23P 6/002 |

FOREIGN PATENT DOCUMENTS

| | | | |
|---|---|---|---|
| EP | 2369174 B1 | 11/2012 | |
| EP | 2616670 A1 | 7/2013 | |
| IN | WO 2015166441 A2 * | 11/2015 | ............. B23P 6/002 |
| JP | 2006152862 A | 6/2006 | |
| WO | WO 2010/147480 A1 | 12/2010 | |
| WO | WO 2011/064659 A2 | 6/2011 | |
| WO | WO 2011/095167 A2 | 8/2011 | |
| WO | WO 2012/065613 A1 | 5/2012 | |

* cited by examiner

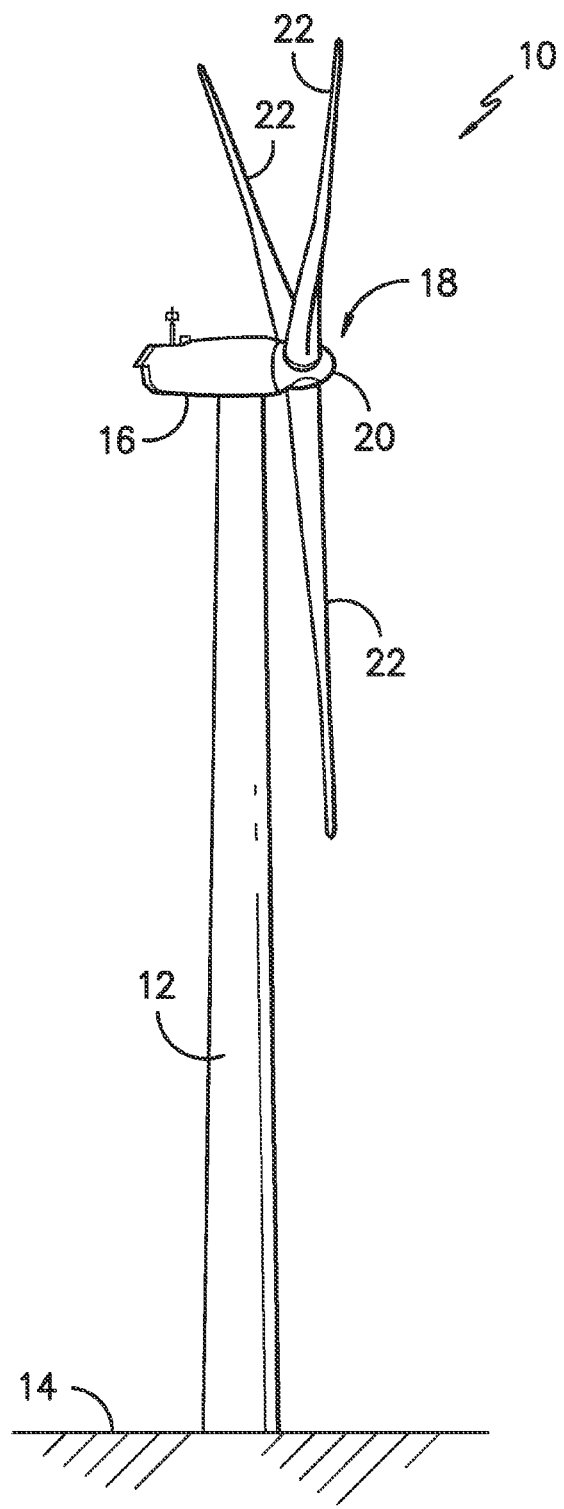
FIG. -1-

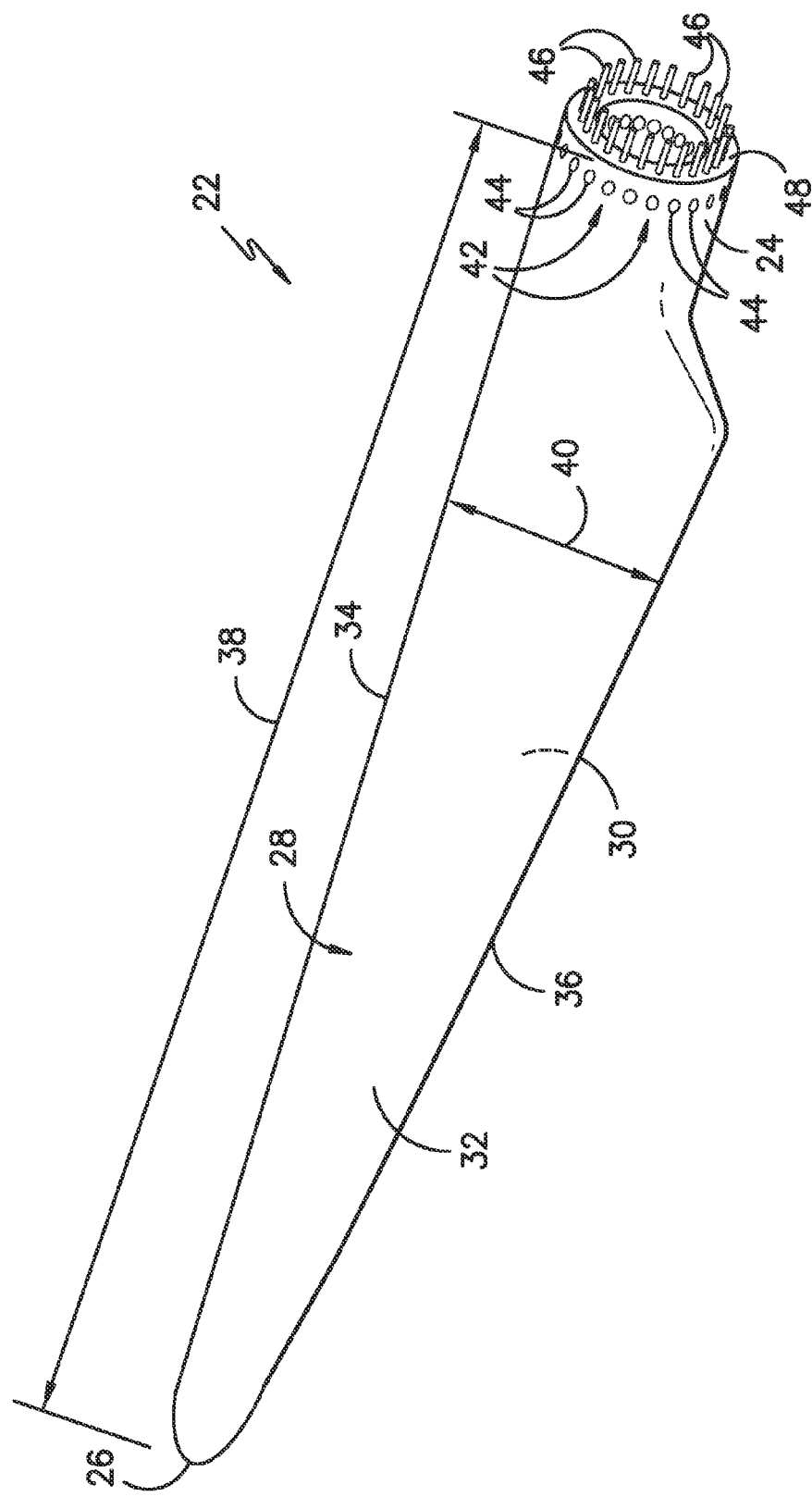
FIG. -2-

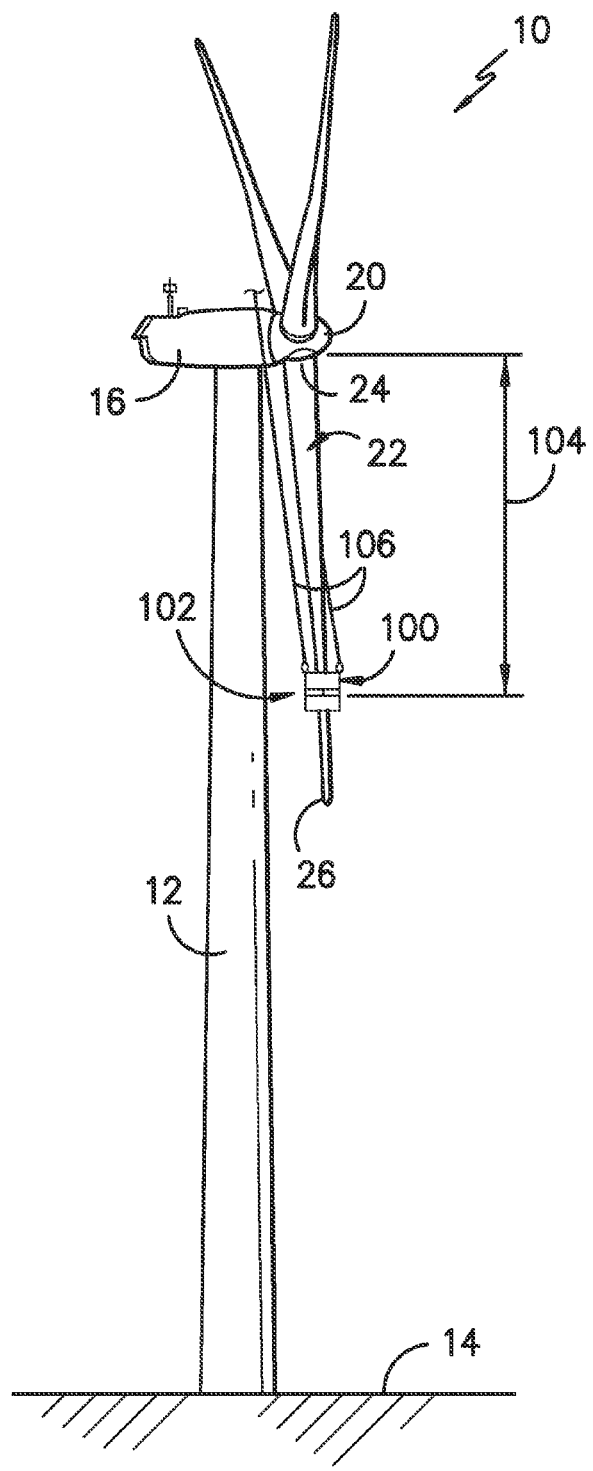
FIG. -3-

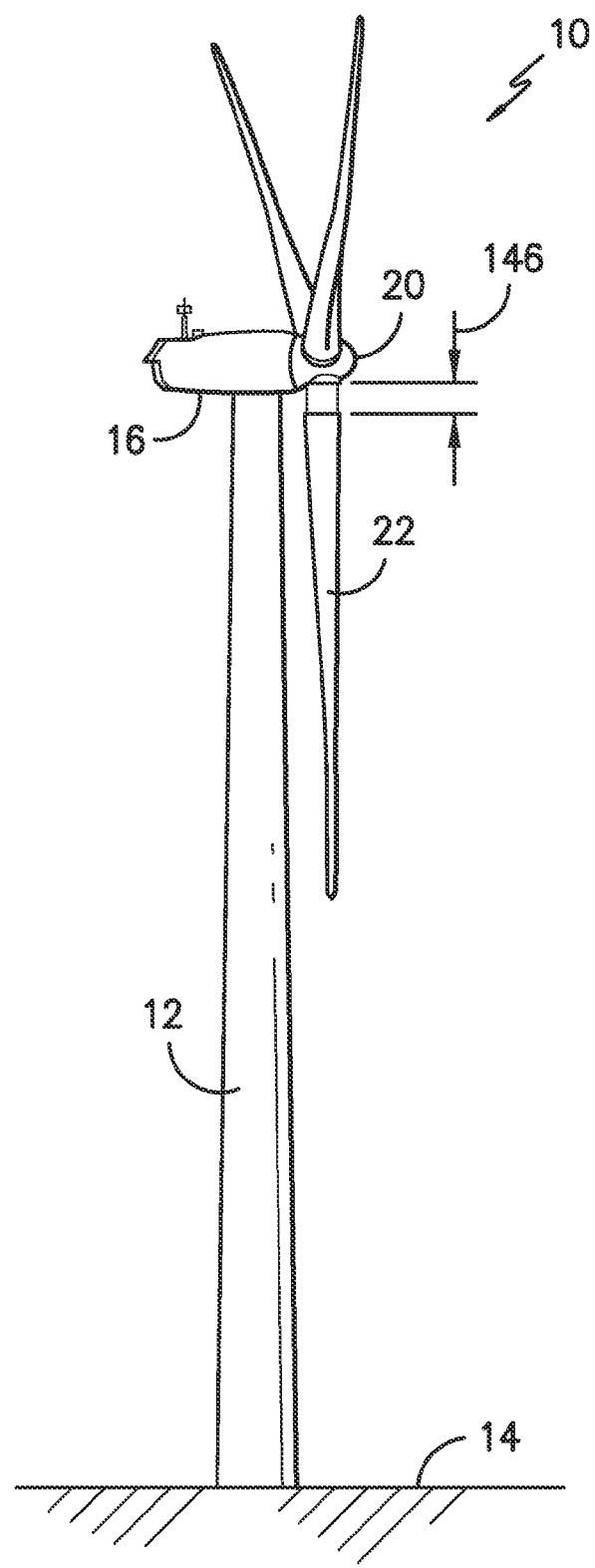
FIG. -4-

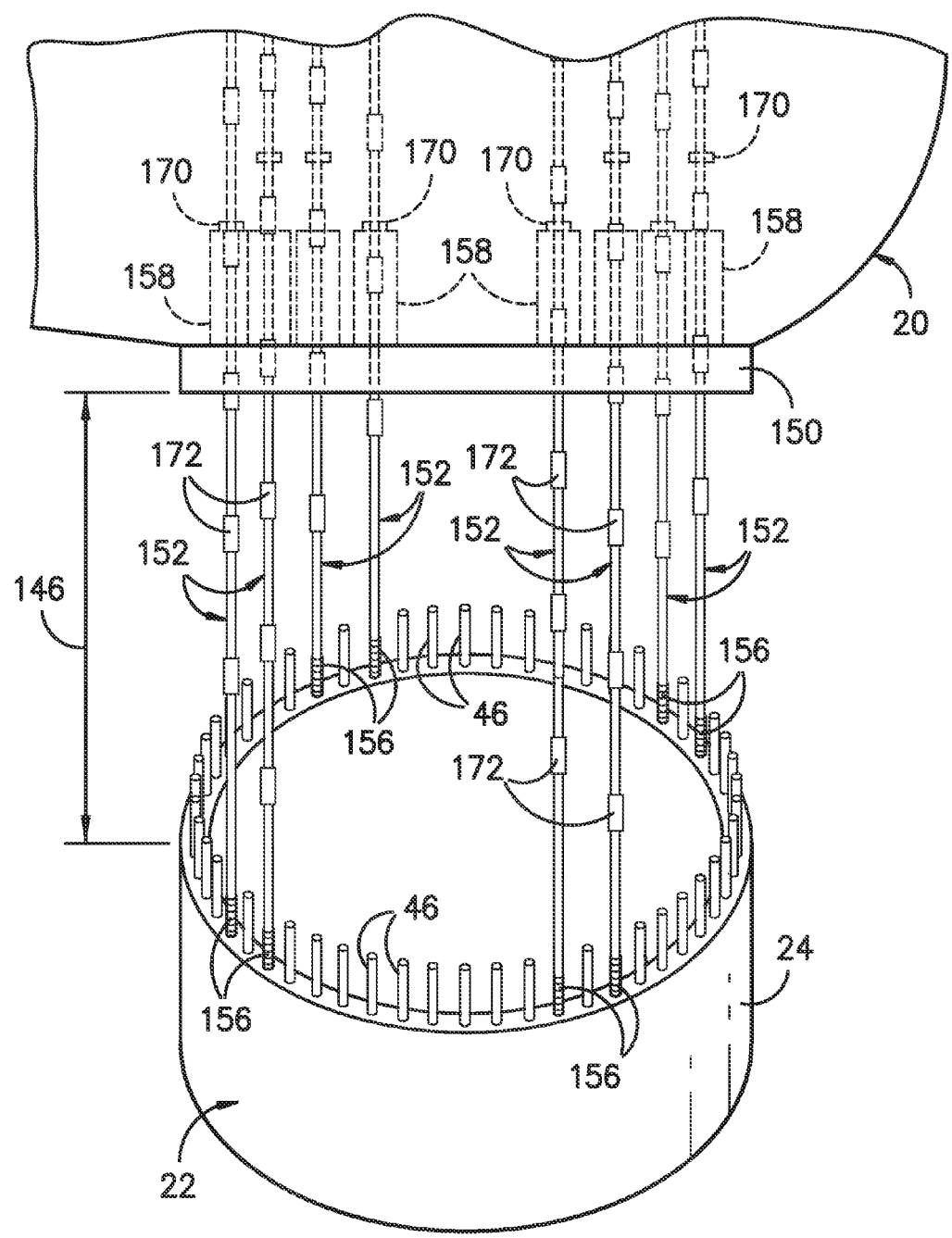
FIG. -5-

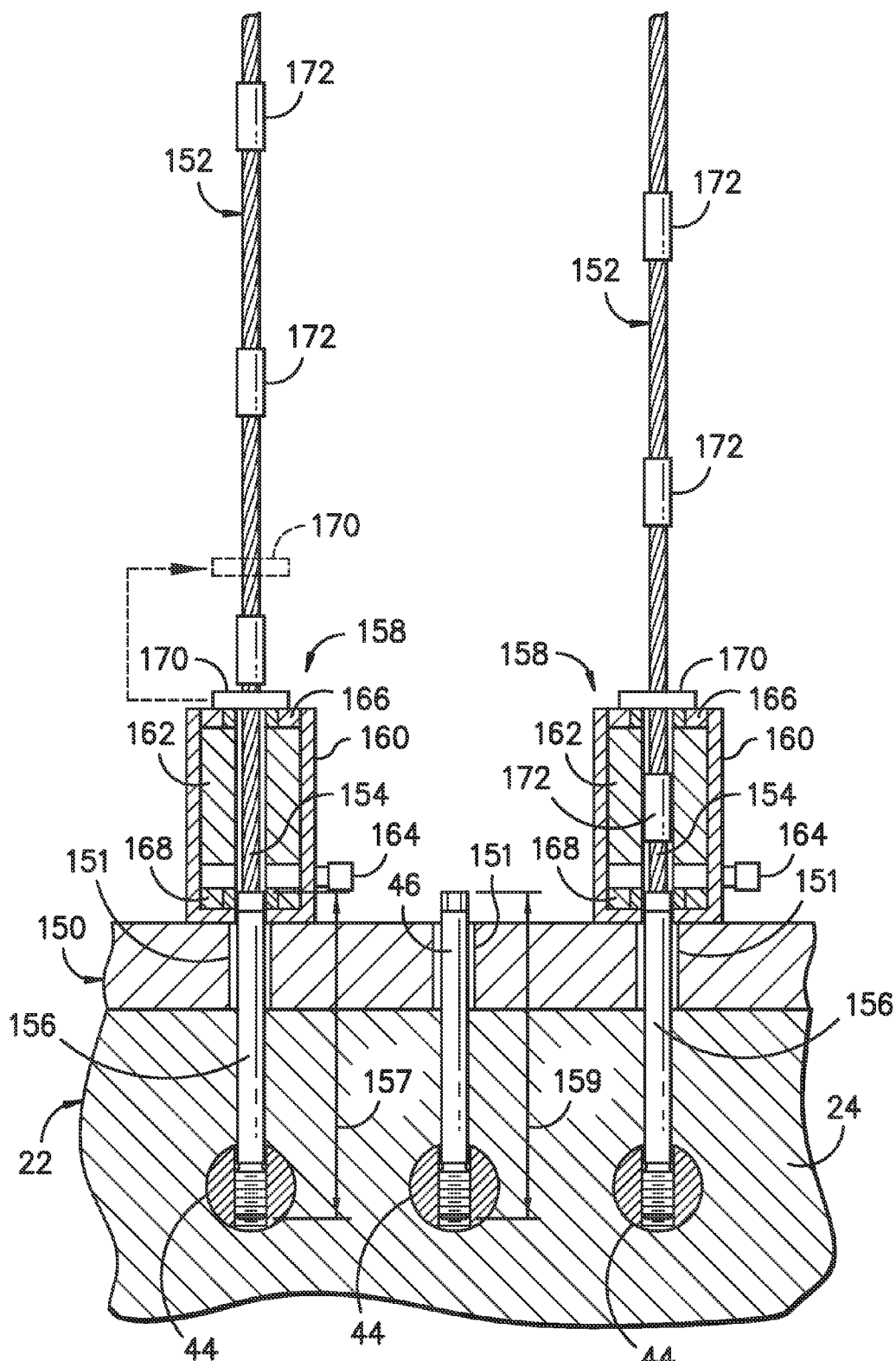
FIG. -6-

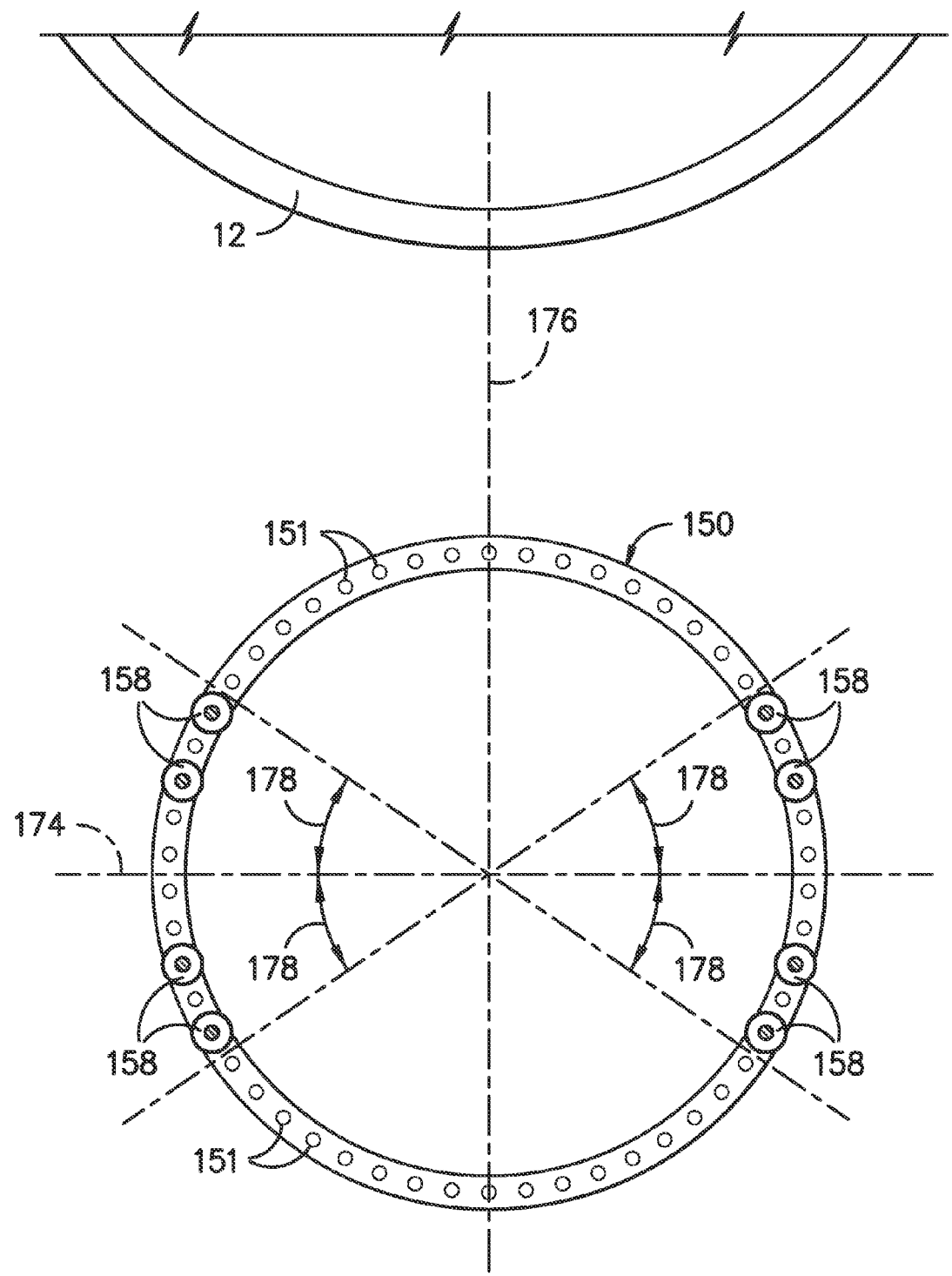
FIG. -7-

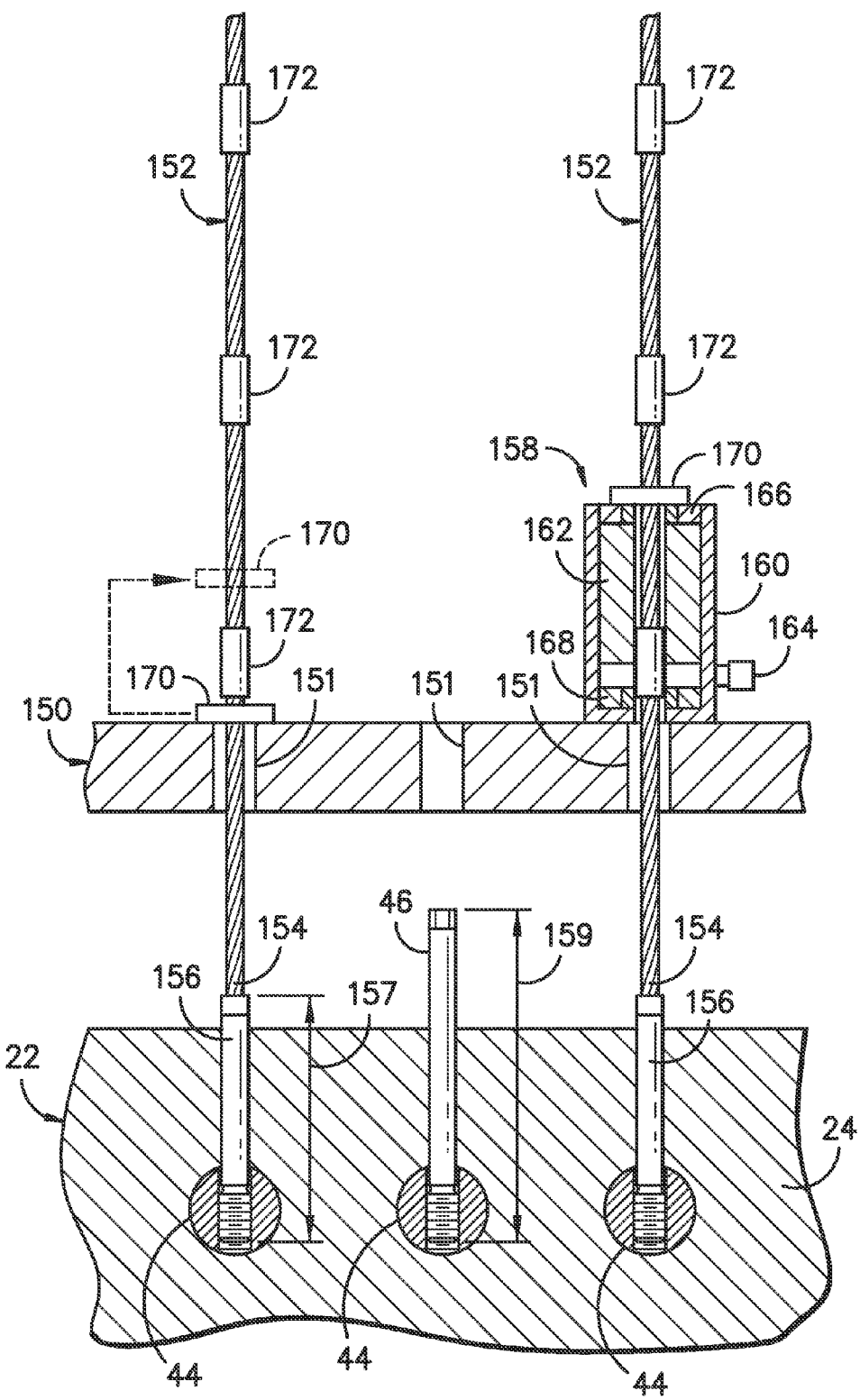
FIG. -8-

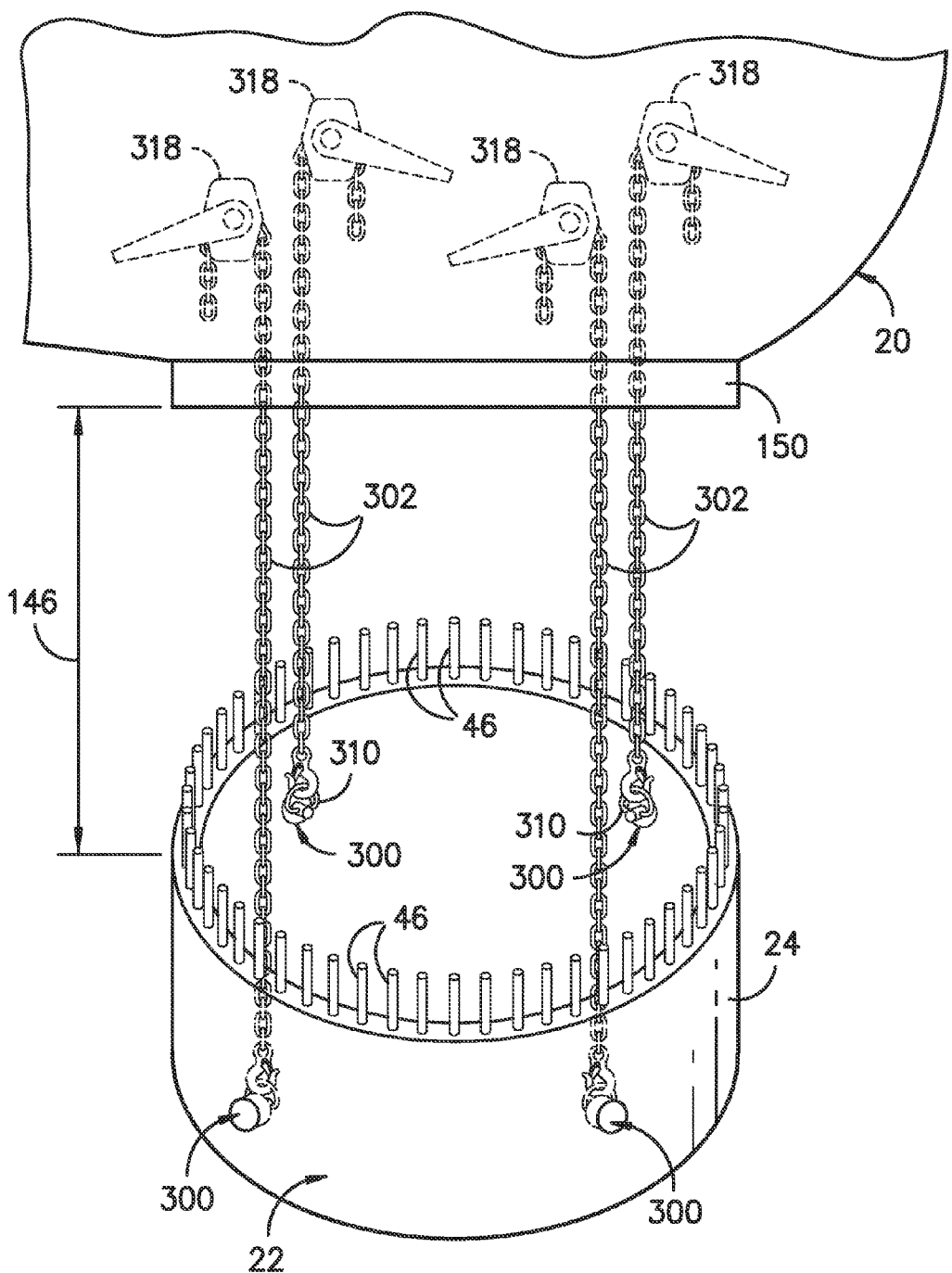
FIG. -9-

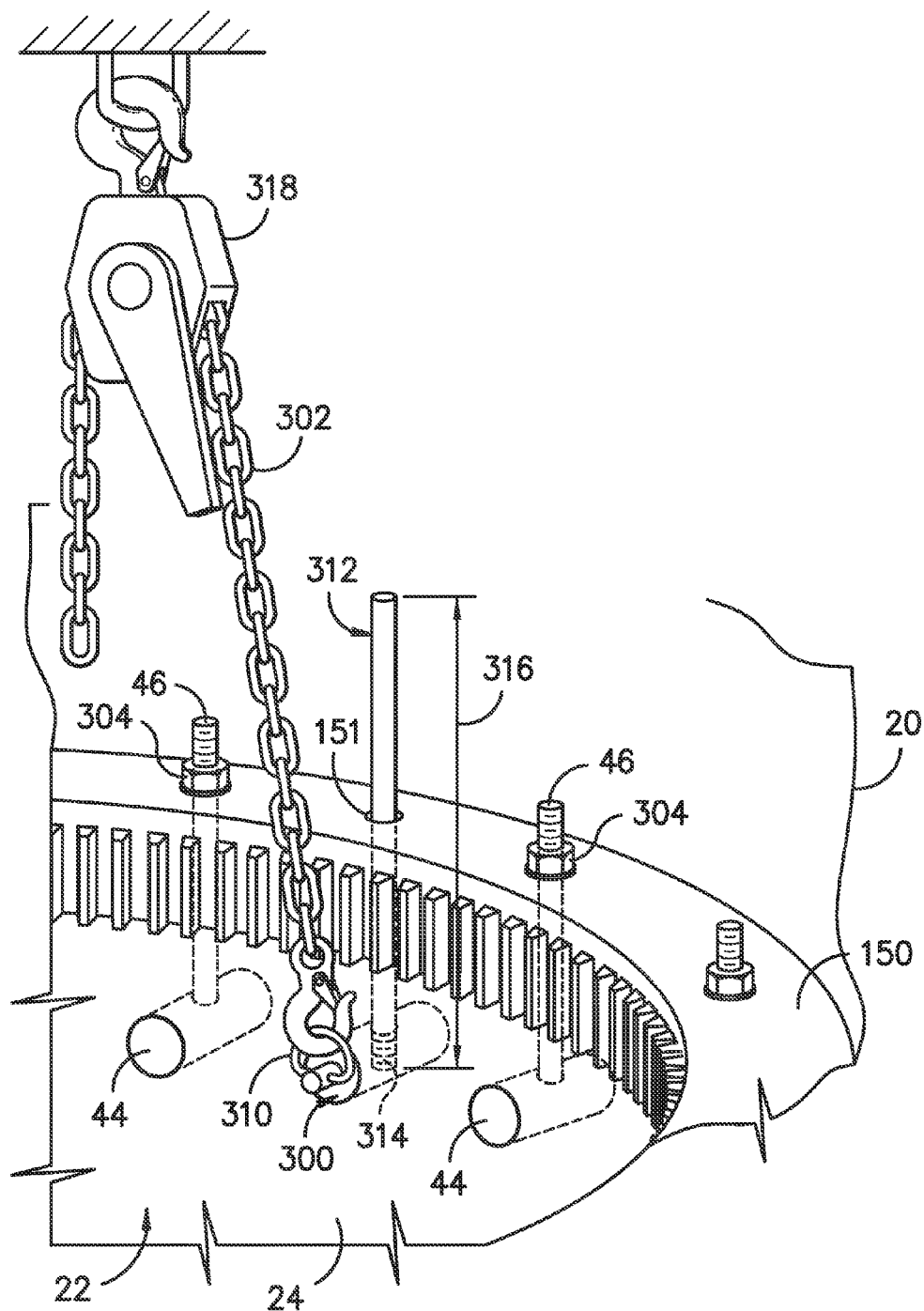
FIG. -10-

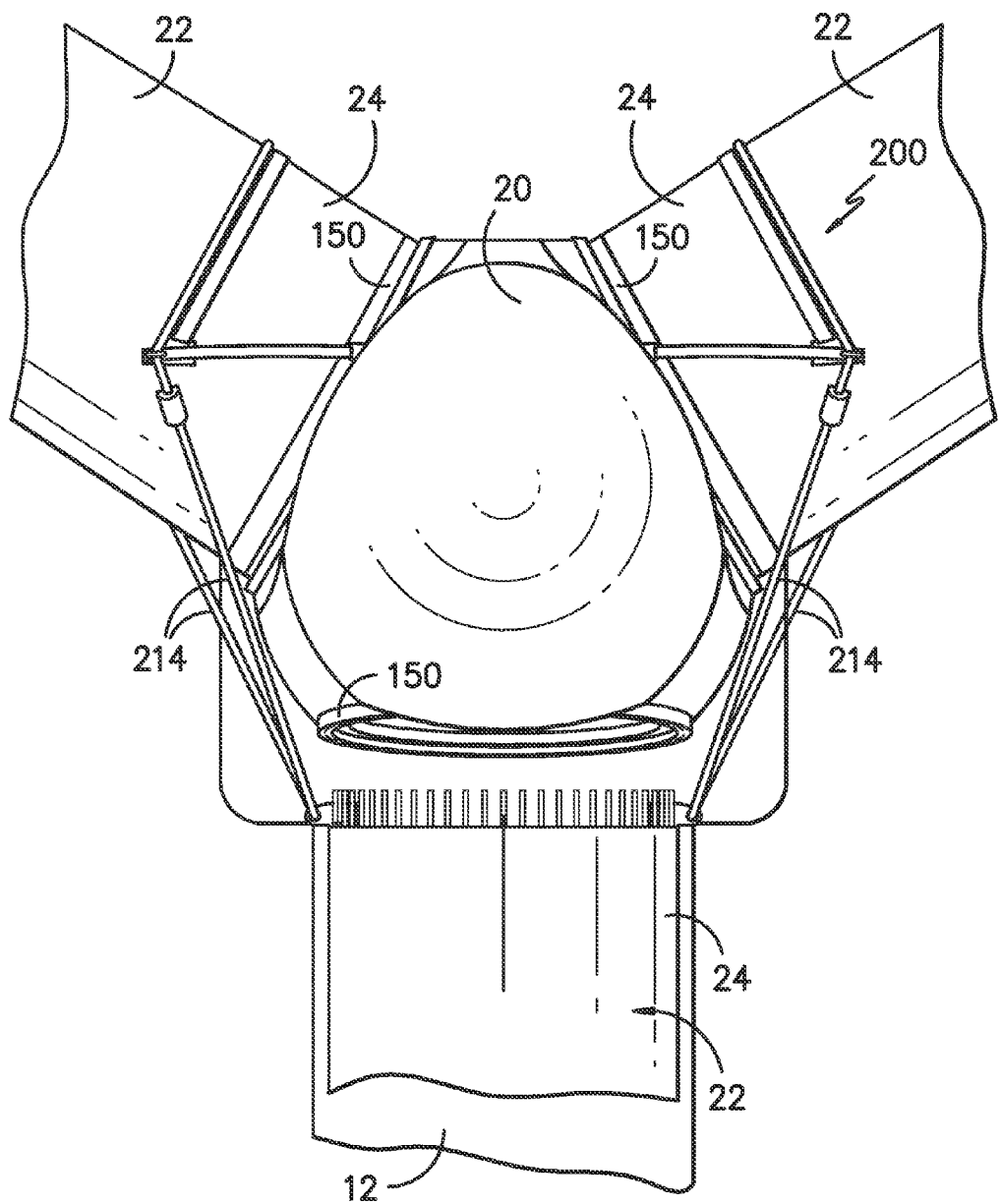
FIG. -11-

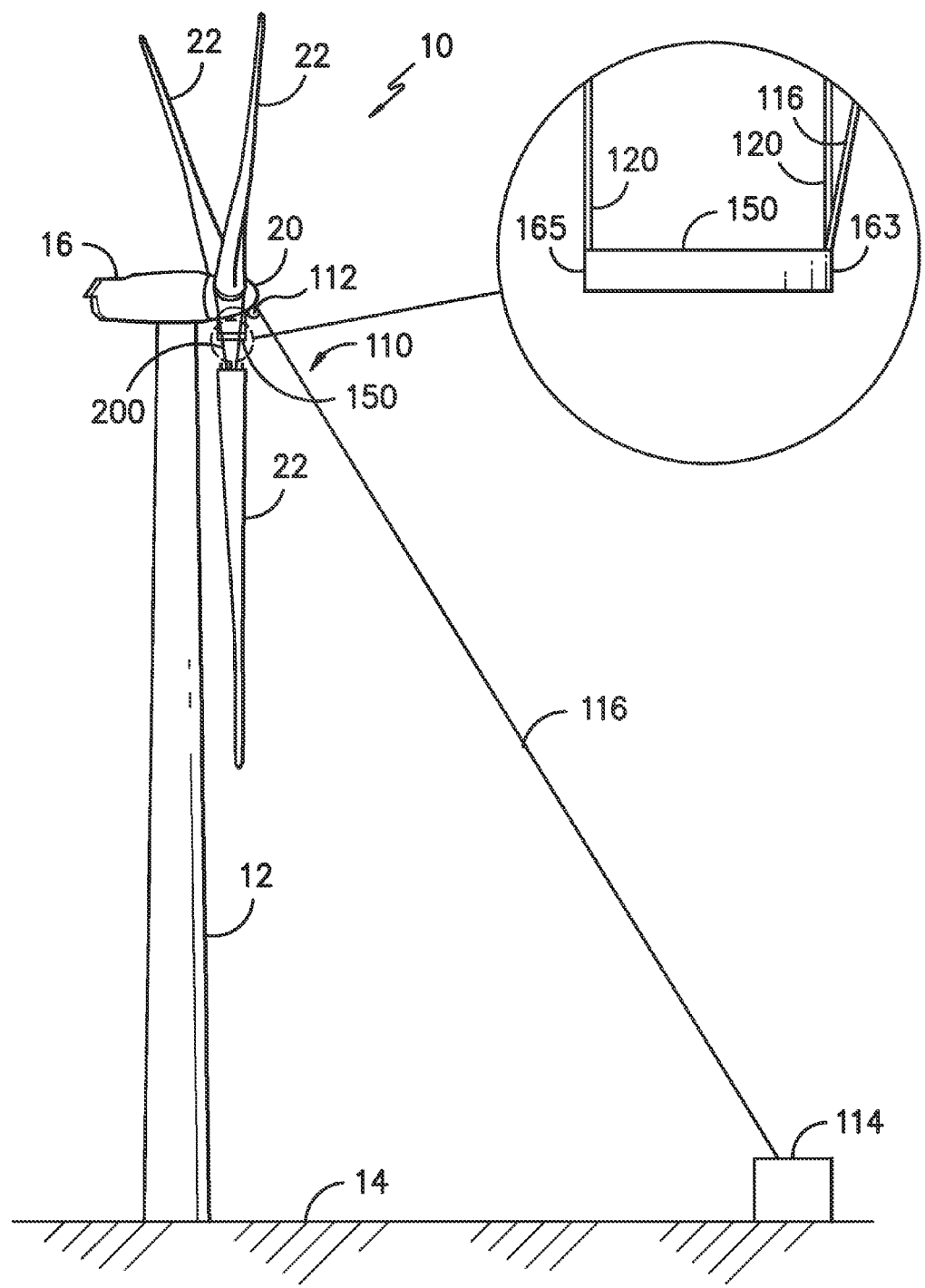
FIG. -12-

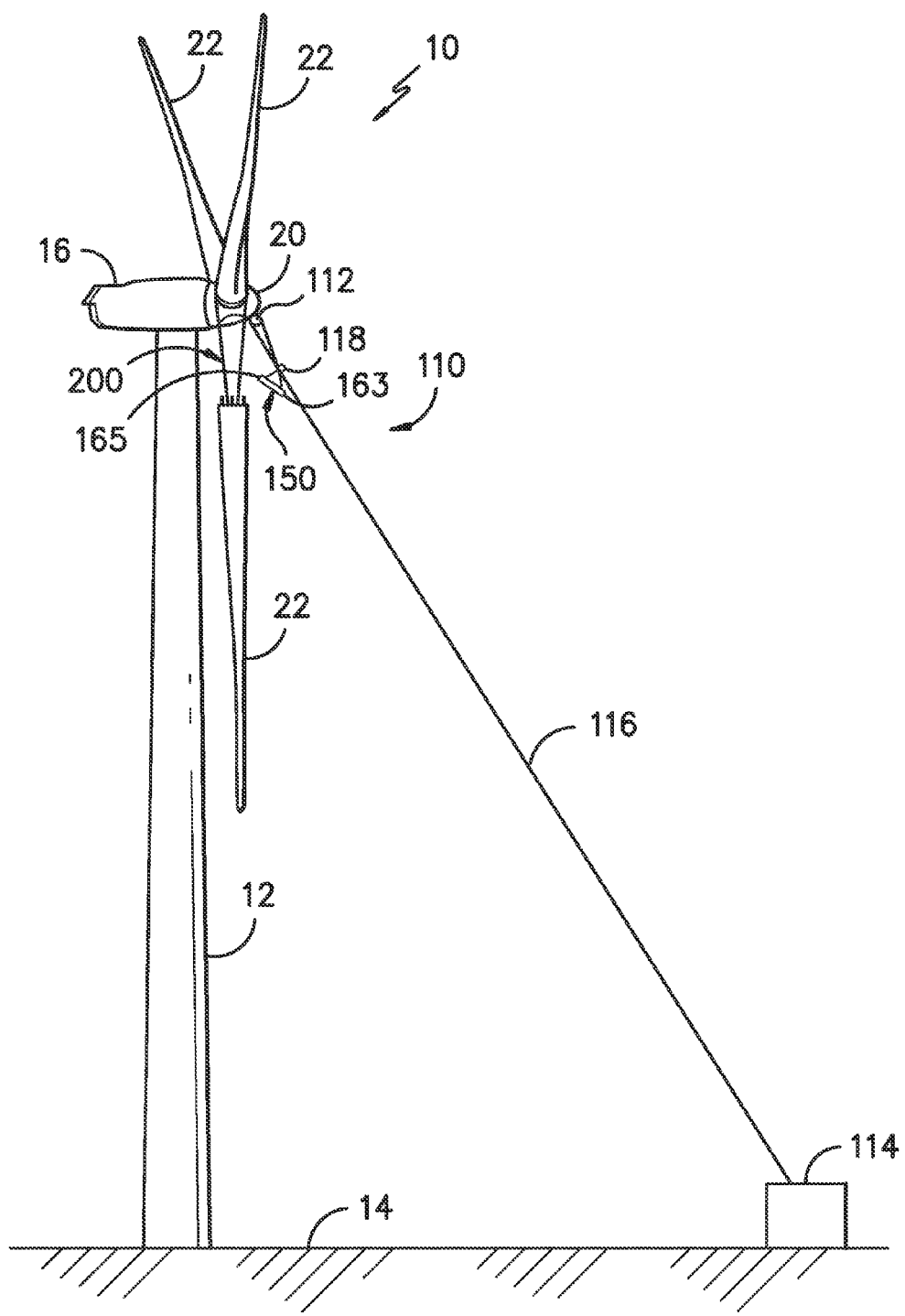
FIG. -13-

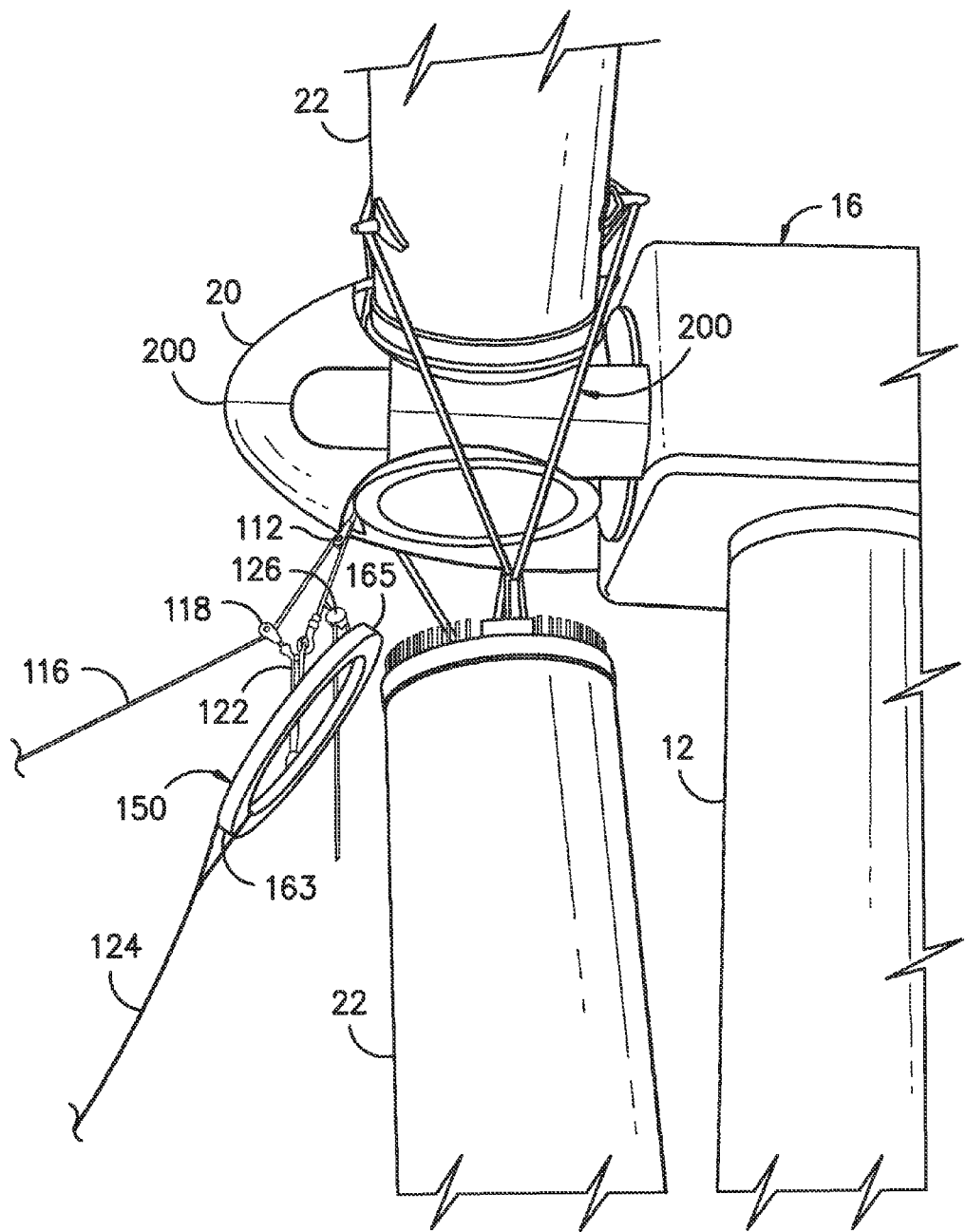
FIG. -14-

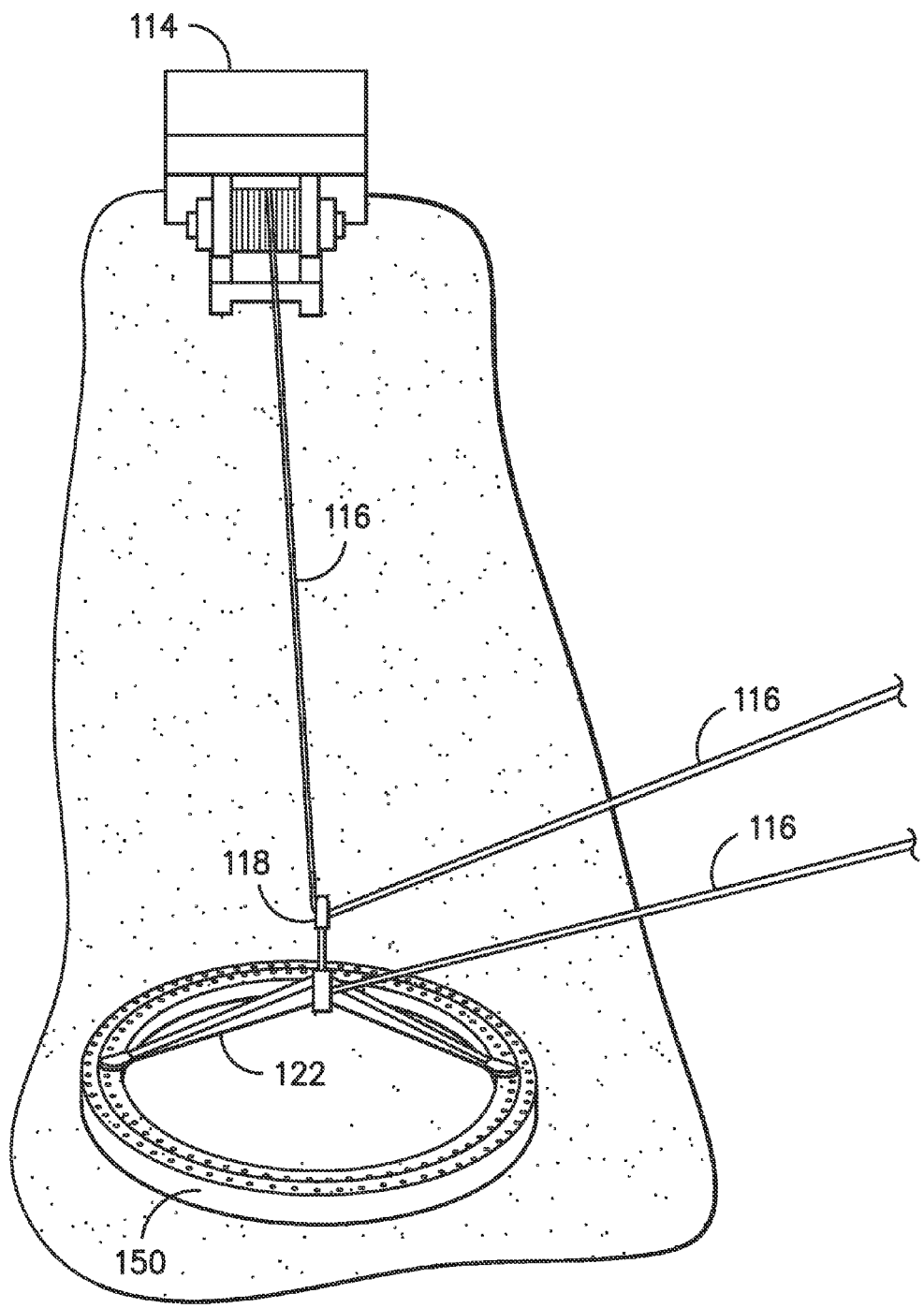
FIG. -15-

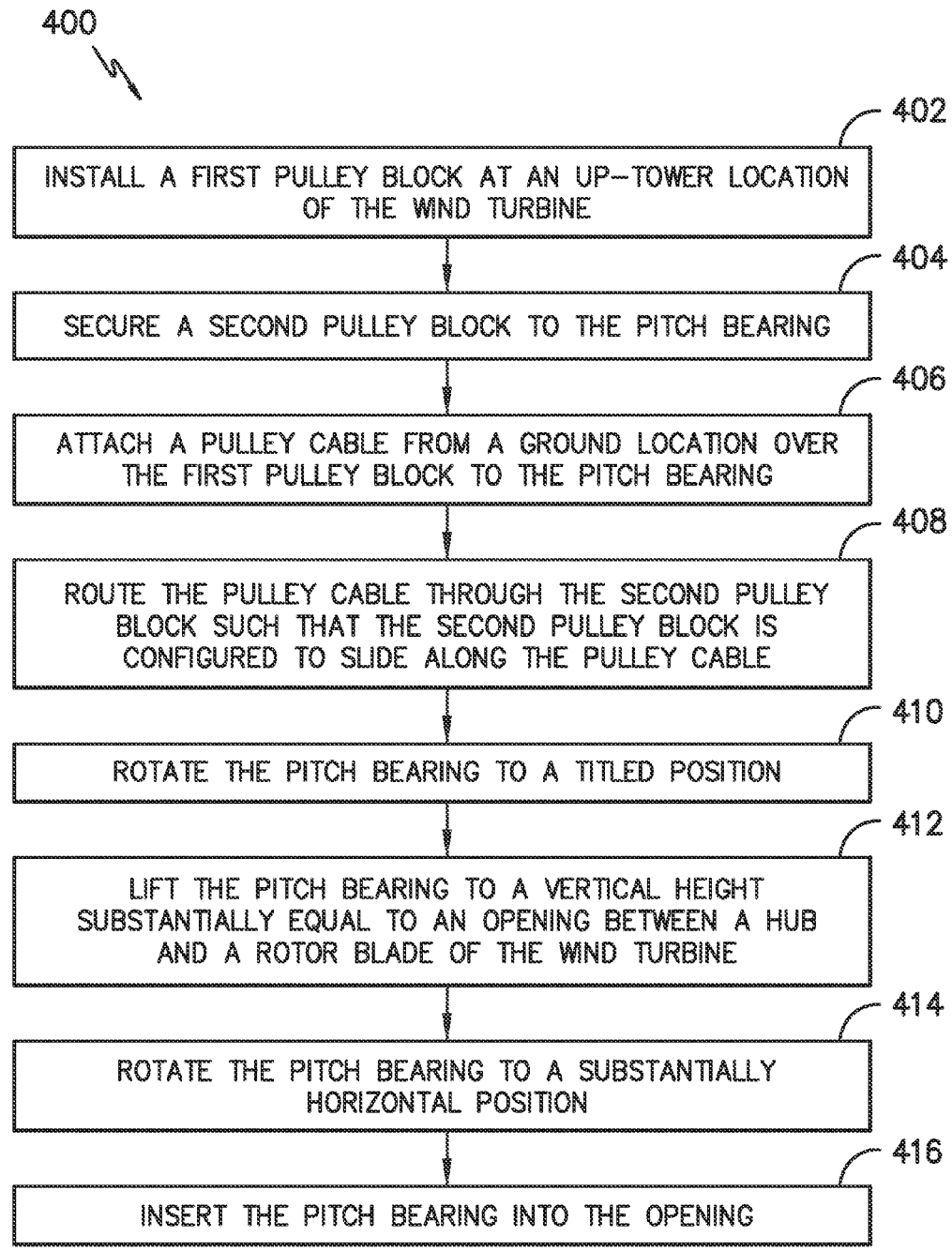
FIG. -16-

SYSTEM AND METHOD FOR REPLACING A PITCH BEARING

FIELD OF THE INVENTION

The present disclosure relates generally to wind turbines, and more particularly to systems and methods for replacing a pitch bearing of a wind turbine.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, a hub mounted to the nacelle, and one or more rotor blades mounted to the hub. Each of the rotor blades are typically mounted to the hub via a pitch bearing. The pitch bearings are configured to change the pitch angle of each of the blades to capture kinetic energy of the wind using known airfoil principles. The rotor blades transmit the kinetic energy from the wind in the form of rotational energy so as to turn a shaft coupling the rotor blades to the gearbox, or if the gearbox is not used, directly to the generator. The generator then converts the mechanical energy to electrical energy that may be deployed to a utility grid.

Typically, to initially install a pitch bearing and/or to replace one of the existing pitch bearings from the hub, a significantly large crane must be transported to the wind turbine site in order to provide a means for lifting and/or lowering the pitch bearing to the hub that is mounted atop the tower. Unfortunately, it is often extremely expensive to both transport the crane to the wind turbine site and operate the crane for the amount of time necessary to install and/or replace the pitch bearing(s). As a result, the costs of employing such large cranes currently accounts for a significant portion of the overall costs associated with initial wind turbine installations and pitch bearing maintenance operations.

Accordingly, improved methods and related systems for replacing pitch bearings that do not require the use of a significantly large crane would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a method for removing a pitch bearing operatively coupled between a rotor blade and a hub configured atop a tower of the wind turbine. The method includes installing a first pulley block at an up-tower location of the wind turbine and configuring a second pulley block with the pitch bearing. Another step includes routing a pulley cable from a ground location over the first pulley block to the second pulley block such that the second pulley block is configured to slide along the pulley cable. A further step includes removing the pitch bearing from between the hub and the rotor blade in a substantially horizontal position, wherein the horizontal position includes the leading edge of the pitch bearing having substantially the same height as the trailing edge of the pitch bearing. Next, the method includes rotating the pitch bearing to a tilted position, wherein the tilted position includes a leading edge of the pitch bearing being lower than a trailing edge of the pitch bearing. Thus, the method also includes lowering the pitch bearing from atop the tower in the tilted position so as to prevent the pitch bearing from colliding with the rotor blade.

In one embodiment, the method also includes positioning the pitch bearing and the rotor blade in a substantially six o'clock position. Further, the method may include separating the rotor blade from the pitch bearing (e.g. by removing the blade bolts) and lowering the rotor blade an initial vertical distance from the hub before attaching the first pulley block.

In further embodiments, the method may include securing a rigging system to the pitch bearing. Thus, in such embodiments, the method may further include securing the second pulley block to a central connection point of the rigging system of the pitch bearing and attaching the pulley cable to the second pulley block.

In additional embodiments, the rigging system of the pitch bearing may also include a cable hoist configured to rotate or tilt the pitch bearing between the tilted position and the horizontal position. More specifically, in particular embodiments, the cable hoist may be a battery-operated cable hoist that is configured to adjust a length of a cable connected between the pulley cable and the pitch bearing so as to tilt one edge of the bearing with respect to an opposite edge of the bearing. Further, the cable hoist may be controlled remotely, via a remote control, as a safety/operability advantage.

In particular embodiments, the ground location may correspond to a ground winch. Thus, the step of lowering (or lifting) the pitch bearing may be performed by coordinated winch operation.

In still further embodiments, the method may also include attaching a tag line to the leading edge of the pitch bearing to control the pitch bearing during lowering (or lifting). As used herein, the "leading edge" of the pitch bearing generally refers to the edge of the pitch bearing that is at the forefront of movement. Therefore, if the pitch bearing is being lifted to the hub, then the leading edge is the edge closest to the hub. In contrast, if the pitch bearing is being lowered to the ground, then the leading edge is the edge closest to the ground.

In another aspect, the present disclosure is directed to a method for installing a pitch bearing of a wind turbine. The method includes installing a first pulley block at an up-tower location of the wind turbine and configuring a second pulley block with the pitch bearing. Another step includes routing a pulley cable from a ground location over the first pulley block to the second pulley block such that the second pulley block is configured to slide along the pulley cable. The method also includes rotating the pitch bearing to a tilted position, wherein the tilted position includes a leading edge of the pitch bearing being higher than a trailing edge of the pitch bearing. The method further includes lifting the pitch bearing to a vertical height substantially equal to an opening between a hub and a rotor blade of the wind turbine. In addition, the method includes rotating the pitch bearing to a horizontal position, wherein the horizontal position includes the leading edge of the pitch bearing having substantially the same height as the trailing edge of the pitch bearing. Thus, a further step of the method includes inserting the pitch bearing into the opening while the pitch bearing is in the horizontal position.

In one embodiment, the method may also include positioning the rotor blade in a substantially six o'clock position before lifting the pitch bearing. In another embodiment, the method may further include securing the pitch bearing to the hub and securing the rotor blade to the pitch bearing after inserting the pitch bearing into the opening between the hub and the rotor blade. Further, it should be understood that the method may further include any of the additional steps and/or features as described herein.

In yet another aspect, the present disclosure is directed to a pulley system for removing or installing a pitch bearing between a rotor blade and a hub configured atop a wind turbine tower. The pulley system includes a first pulley block located at an up-tower location of the wind turbine, a rigging system secured to the pitch bearing, a second pulley block secured to the rigging system of the pitch bearing, a pulley cable, and a cable hoist. The pulley cable extends from a ground location over the first pulley block to the rigging system of the pitch bearing and is routed through the second pulley block such that the second pulley block is configured to slide along the pulley cable. Further, the cable hoist is configured with the rigging system of the pitch bearing and is configured to rotate the pitch bearing between a tilted position and a horizontal position. Thus, the pulley system is configured to lift and/or lower the pitch bearing between a support surface of the wind turbine and a vertical height substantially equal to an opening between a hub and a rotor blade of the wind turbine.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of a wind turbine according to one embodiment of the present disclosure;

FIG. 2 illustrates a perspective view of a rotor blade according to one embodiment of the present disclosure;

FIG. 3 illustrates another perspective view of the wind turbine shown in FIG. 1, particularly illustrating a rotor blade to be removed from the wind turbine positioned in a generally vertical orientation relative to a support surface of the wind turbine;

FIG. 4 illustrates another perspective view of the wind turbine shown in FIG. 3, particularly illustrating the rotor blade lowered to an initial vertical height;

FIG. 5 illustrates a close-up, partial perspective view of the rotor blade and the hub shown in FIG. 4, particularly illustrating one embodiment of a lowering system including support cables secured to the rotor blade and extending through both a pitch bearing of the wind turbine and corresponding cable translation devices positioned within the hub;

FIG. 6 illustrates a cross-sectional view of the rotor blade and the pitch bearing shown in FIG. 5 prior to the rotor blade being lowered from the hub, particularly illustrating a pair of the support cables and cable translation devices of the lowering system shown in FIG. 5;

FIG. 7 illustrates a top-down view of the pitch bearing shown in FIGS. 5 and 6, particularly illustrating the circumferential positioning of the cable translation devices around the pitch bearing relative to a tower reference line extending radially from the center of the wind turbine tower through the center of the pitch bearing;

FIG. 8 illustrates a similar cross-sectional view to that shown in FIG. 6, particularly illustrating a variation of the blade lowering system in which each pair of support cables secured to the rotor blade includes one support cable in operative association with a corresponding cable transition device and another support cable extending through the pitch bearing without being received within a cable translation device;

FIG. 9 illustrates a close-up, partial perspective view of the rotor blade and the hub shown in FIG. 4, particularly illustrating another embodiment of a lowering system including support cables secured to the rotor blade and corresponding cable translation devices positioned within the hub;

FIG. 10 illustrates a close-up, partial perspective view of the interface between the rotor blade and the pitch bearing shown in FIG. 9 prior to the rotor blade being lowered from the hub, particularly illustrating a support cable coupled between a support nut installed within the blade root and a corresponding cable translation device positioned within the hub;

FIG. 11 illustrates a perspective view of one embodiment of the hub of the wind turbine, particularly illustrating a suspension system for a suspending a rotor blade according to the present disclosure;

FIG. 12 illustrates a perspective view one embodiment of a pulley system that may be utilized to replace the pitch bearing according to the present disclosure, particularly illustrating the pitch bearing in a horizontal position;

FIG. 13 illustrates a perspective view of one embodiment of a pulley system that may be utilized to replace the pitch bearing according to the present disclosure, particularly illustrating the pitch bearing in a tilted position;

FIG. 14 illustrates a detailed, perspective view of another embodiment of a pulley system that may be utilized to replace the pitch bearing according to the present disclosure, particularly illustrating the pitch bearing in a tilted position;

FIG. 15 illustrates a perspective view of one embodiment of a pulley system according to the present disclosure, particularly illustrating the rigging system of the pulley system configured with the pitch bearing; and FIG. 16 illustrates a flow diagram of one embodiment of a method for installing a pitch bearing of a wind turbine.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present subject matter is directed to various systems and methods for replacing pitch bearings of a wind turbine. Specifically, as will become apparent from the description provided below, the disclosed systems and methods may allow for the removal and/or installation of pitch bearings without the use of a large, expensive crane, thereby significantly reducing the costs associated with blade removal and/or blade installation.

Referring now to the drawings, FIG. 1 illustrates a side view of one embodiment of a wind turbine 10. As shown, the wind turbine 10 generally includes a tower 12 extending from a support surface 14 (e.g., the ground, a concrete pad or any other suitable support surface). In addition, the wind turbine 10 may also include a nacelle 16 mounted on the tower 12 and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator (not shown) positioned within the nacelle 16 to permit electrical energy to be produced.

Referring now to FIG. 2, a perspective view of one of the rotor blades 22 shown in FIG. 1 is illustrated in accordance with aspects of the present subject matter. As shown, the rotor blade 22 includes a blade root 24 configured for mounting the rotor blade 22 to the hub 20 of a wind turbine 10 (FIG. 1) and a blade tip 26 disposed opposite the blade root 24. A body 28 of the rotor blade 22 may extend lengthwise between the blade root 24 and the blade tip 26 and may generally serve as the outer shell of the rotor blade 22. As is generally understood, the body 28 may define an aerodynamic profile (e.g., by defining an airfoil shaped cross-section, such as a symmetrical or cambered airfoil-shaped cross-section) to enable the rotor blade 22 to capture kinetic energy from the wind using known aerodynamic principles. Thus, the body 28 may generally include a pressure side 30 and a suction side 32 extending between a leading edge 34 and a trailing edge 36. Additionally, the rotor blade 22 may have a span 38 defining the total length of the body 28 between the blade root 24 and the blade tip 26 and a chord 40 defining the total length of the body 28 between the leading edge 34 and the trailing edge 36. As is generally understood, the chord 40 may vary in length with respect to the span 38 as the body 29 extends from the blade root 24 to the blade tip 26.

Moreover, as shown in FIG. 2, the rotor blade 22 may also include a plurality of T-bolts or root attachment assemblies 42 for coupling the blade root 22 to the hub 20 of the wind turbine 10. In general, each root attachment assembly 42 may include a barrel nut 44 mounted within a portion of the blade root 24 and a root bolt 46 coupled to and extending from the barrel nut 44 so as to project outwardly from a root end 48 of the blade root 24. By projecting outwardly from the root end 48, the root bolts 46 may generally be used to couple the blade root 24 to the hub 20 via a pitch bearing 150 (FIG. 5) of the wind turbine 10. For example, the pitch bearing 150 may define a plurality of bolt holes 151 (FIGS. 6-7) configured to receive the root bolts 48. Additionally, as will be described below, a portion of such root bolts 46 may also be utilized when the rotor blade 22 is being removed from and/or installed onto the hub 20.

Referring now to FIG. 3, the rotor blade 22 coupled with the pitch bearing 150 to be removed may be initially rotated to a vertically downward position (e.g., a six o'clock position) such that the blade 22 has a generally vertical orientation relative to the support surface 14 of the wind turbine 10. For example, as shown in FIG. 3, the rotor blade 22 is extending vertically downward from the hub 20 such that the blade tip 26 is pointing towards the support surface 14. It should be appreciated that, due to a tilt angle and/or cone angle of the wind turbine 10, the rotor blade 22 may be angled slightly away from the tower 12 when moved to the vertically downward position.

In several embodiments, once the rotor blade 22 is rotated to the vertically downward position, an optional blade tip-rigging sleeve 100 may be installed onto the blade 22 to provide attachment points for various cables and/or lines of the present disclosure and/or to provide protection to the rotor blade 22. Further, as shown in FIG. 3, the tip-rigging sleeve 100 may be installed at an intermediate location 102 defined between the blade root 24 and the blade tip 26. In one embodiment, the intermediate location 102 may correspond to a location defined along an outboard section of the rotor blade 22, such as at a location spaced apart from the blade root 24 by a distance 104 that is greater that about 50% of the blade span 38 (FIG. 2). For example, the distance 104 may range from about 50% of the span 38 to about 95% of the span 38, such as from about 65% of the span 38 to about 95% of the span 38 or from about 75% of the span 38 to about 90% of the span 38 and any other subranges therebetween.

Still referring to FIG. 3, to install the tip-rigging sleeve 100 onto the rotor blade 22, one or more lift cables 106 may be secured to the blade tip-rigging sleeve 100 and may extend upward to an up-tower location, such as at a location on and/or within the hub 20 or the nacelle 16. For instance, in one embodiment, the lift cable(s) 106 may extend upward from the tip-rigging sleeve 100 to personnel located within and/or on top of the hub 20 or the nacelle 16. Regardless, the lift cable(s) 106 may be used to lift the tip-rigging sleeve 100 vertically upwards relative to the support surface 14 to allow the tip-rigging sleeve 100 to be installed around the rotor blade 22 at the intermediate location 102. For instance, the blade tip-rigging sleeve 100 may define a closed shape configured to extend around the outer perimeter of the rotor blade 22. Thus, when lifting the tip-rigging sleeve 100 via the lift cable(s) 106, the tip-rigging sleeve 100 may be carefully aligned with the rotor blade 22 such that the blade tip 26 is received within the tip-rigging sleeve 100. It should be understood by those of ordinary skill in the art that the system and method as described herein can operate without the use of the blade tip-rigging sleeve 100. In such an embodiment, the cables and/or guide cables as described herein may be attached directly to the rotor blade 22.

Referring now to FIG. 4, the rotor blade 22 may be initially lowered from the hub 22 by an initial vertical distance 146. As will be described below, such initial lowering of the rotor blade 22 may allow for one or more up-tower pulleys 112 to be coupled between the rotor blade 22 and another up-tower component of the wind turbine 10, thereby providing a means for replacing the pitch bearing 150 according to the present disclosure. Thus, the initial vertical distance 146 may generally correspond to any suitable distance that allows for the installation of the pulley(s) and any associated pulley cable(s) or pulley cable (s). For example, in one embodiment, the initial vertical distance 146 may generally range from about 2 feet to about 15 feet, such as from about 3 feet to about 10 feet or from about 5 feet to about 10 feet and any other subranges therebetween.

Referring now to FIGS. 5-7, one embodiment of suitable components that may be included within a lowering system to initially lower the rotor blade 22 from the hub 20 is illustrated in accordance with aspects of the present subject matter. Specifically, FIG. 5 illustrates a partial perspective view of the hub 20, the rotor blade 22 and the pitch bearing 150 of the wind turbine 10 after the blade 22 has been lowered from the hub 20 by the initial vertical distance 146. FIG. 6 illustrates a partial, cross-sectional view of the interface between the rotor blade 22 and the pitch bearing 150 prior to the blade 22 being lowered relative to the hub 20. Additionally, FIG. 7 illustrates a top view of the pitch bearing 150 of the wind turbine 10, particularly illustrating the relative circumferential positioning of the system components utilized to initially lower the rotor blade 22 relative to the hub 20.

It should be appreciated that, for purposes of illustration, only the inner race of the pitch bearing 150 is shown. As is generally understood, the pitch bearing 150 may also include an outer race configured to be coupled to the hub 20. As such, when the inner race is rotated relative to the outer race of the pitch bearing 150, the rotor blade 22 may be pitched about its pitch axis.

As particularly shown in FIGS. 5 and 6, to allow the rotor blade 22 to be initially lowered, several of the root bolts 46 extending through the bolt holes 151 defined in the pitch bearing 150 may be removed and replaced with suitable support cables 152. For example, as shown in FIG. 5, in one embodiment, eight of the root bolts 46 have been removed and replaced with corresponding support cables 152. In doing so, the remainder of the root bolts 46 may be initially maintained in engagement with the pitch bearing 150 (e.g., via suitable attachment nuts (not shown)) to allow the rotor blade 22 to continue to be supported by the hub 20 until the rotor blade 22 is ready to be lowered.

In general, the support cables 152 may correspond to any suitable cables that are capable of supporting the weight of the rotor blade 22 as it is being lowered relative to the hub 20. For example, in several embodiments, each support cable 152 may correspond to a steel cable or any other suitable wire rope that has a rated load capacity sufficient to handle the weight of the rotor blade 22. In another embodiment, each support cable 152 may correspond to a metal chain or any other suitable elongated cable-like object. Moreover, it should be appreciated that each support cable 152 may generally be configured to define any suitable length that permits the cables to be utilized to lower the rotor blade 22 away from the hub 20 by the initial vertical distance 146.

In addition, the support cables 152 may generally be configured to be coupled to the rotor blade 22 using any suitable attachment means. For example, as shown in the illustrated embodiment, a root end 154 (FIG. 6) of each cable 152 may be coupled to a threaded cable stud 156 configured to be screwed into one of the barrel nuts 44 extending within the blade root 24. In such an embodiment, a swaged or other suitable connection may be formed between the root end 154 of each cable 152 and each cable stud 156 to securely couple to the cables 152 to the corresponding studs 156. In other embodiments, the support cables 152 may be coupled to the blade root 24 using any other suitable means, such as by coupling each support cable 152 to a suitable mounting fixture configured to be secured to the blade root 24.

It should be appreciated that, in embodiments in which the support cables 152 are coupled to the blade root 24 via the threaded cable studs 156, each cable stud 156 may generally be configured to define any suitable length 157. As shown in FIG. 6, in one embodiment, the length 157 of each cable stud 156 may be substantially equal to a corresponding length 159 of the root bolts 46. Alternatively, as shown in the embodiment of FIG. 8, the length 157 of each cable stud 156 may be less than the length 159 of the root bolts 46.

As shown in FIGS. 5 and 6, each support cable 152 may be configured to be in operative association with a suitable cable translation device 158 positioned within the hub 20. In general, each cable translation device 158 may correspond to any suitable device that allows for the rotor blade 22 to be safely and securely moved relative to the hub 20 using the support cables 152. For example, in several embodiments, each cable translation device 152 may correspond to a fluid-driven actuator (e.g., a hydraulic or pneumatic actuator) configured to be in operative association with a corresponding support cable 152 to allow the rotor blade 22 to be lowered and/or raised relative to the hub 20.

Specifically, in a particular embodiment of the present disclosure, each cable translation device 158 may be configured as a hollow lifting/lowering cylinder or as a single strand jack designed to incrementally lower and/or raise the rotor blade 22. For example, as shown in FIG. 6, each device 158 may include a cylinder 160 configured to be coupled to the pitch bearing 150 (e.g., via suitable bolts and/or other mechanical fasteners (not shown)) and a hollow piston 162 configured to receive one of the support cables 152. The piston 162 may generally be configured to be actuated and retracted relative to the cylinder 160 by supplying/expelling a pressurized fluid to/from the cylinder 160 (e.g., via fluid port 164). In addition, each cable translation device 158 may include an upper clamping mechanism 166 positioned directly above the piston 162 and a lower clamping mechanism 168 positioned directly below the piston 162. As is generally understood, the upper and lower clamping mechanisms 166, 168 may be configured to alternatively clamp the support cable 152 as the piston 162 is actuated and retracted, thereby allowing each translation device 152 to lower or raise the rotor blade 22 in short increments with each actuation/retraction of the piston 162.

Additionally, in several embodiments, a stop block 170 may be configured to be installed around each support cable 152 directly above its corresponding cable translation device 158. In general, each stop block 170 may be configured to serve as a built-in safety feature providing a mechanical stop for each support cable 152 in the event of failure of one of the cable translation devices 158. For example, as particularly shown in FIG. 6, each support cable 152 may include a plurality of lugs 172 spaced apart incrementally along the cable's length. In such an embodiment, an opening or slot (not shown) may be defined through each stop block 170 that is dimensionally larger than the cable 152, thereby allowing the cable 152 to pass through the stop block 170 as it is being lowered relative to the translation device 158. However, given their increased size, the lugs 172 may not be capable of passing through the opening or slot defined in each stop block 170. Accordingly, in the event of failure of one of the cable translation devices 158, the lug 172 positioned immediately above the corresponding stop block 170 may come into contact with and engage an upper surface of the block 170, thereby preventing further motion of the support cable 152 relative to the translation device 158. In contrast, during normal operation, the stop blocks 170 may be continuously repositioned along the support cable 152 as each lug 172 is lowered down onto and/or adjacent to its corresponding stop block 170. For example, as indicated by the dashed lines in FIG. 6, when one of the lugs 172 is lowered down into and/or adjacent to one of the stop blocks 170, the stop block 170 may be removed from the support cable 152 and repositioned above such lug 172 to allow the support cable 152 to continue to be lowered through the translation device 158.

It should be appreciated that, in general, each support cable 152 and corresponding translation device 158 may be configured to be installed at any suitable location around the circumference of the blade root 24 and pitch bearing 150. However, in several embodiments, the cables/devices 152, 158 may be grouped in pairs spaced apart around the blade root 24 and pitch bearing 150. For example, as shown in FIG. 7, in one embodiment, each pair of the cable translation devices 158 may be configured to be positioned around the pitch bearing 150 at circumferential locations generally adjacent to a reference line 174 oriented perpendicularly to a tower reference line 176 extending radially from the center of the wind turbine's tower 12 through the center of the pitch bearing 150. Specifically, as shown, each pair of the cable translation devices 158 may generally be spaced apart circumferentially from the reference line 174 by an angle 178 equal to less than about 45 degrees, such as less than about 40 degrees or less than about 35 degrees. Of course, in such an embodiment, the support cables 152 may similarly be secured to the blade root 24 at a corresponding circumferential location relative to the reference line 174. Such positioning of the cables/devices 152, 158 adjacent to the reference line 174 may, in certain rotor blade configurations, allow for the rotor blade 22 to be slightly angled away from the tower 12 as the blade 22 is being lowered relative to the hub 20 due to the location of the blade's center of gravity.

As indicated above, in one embodiment, eight support cables 152 and corresponding translation devices 158 may be installed to assist in lowering the rotor blade 22 relative to the hub 20. However, in other embodiments, any other suitable number of support cables 152 and translation devices 158 may be utilized to lower the rotor blade 22 relative to the hub 20. For instance, in one embodiment, the rotor blade 22 may be lowered using only four cables/devices 152, 158 or using only two cables/devices 152, 158.

Additionally, in other embodiments, only a portion of the support cables 152 coupled to the rotor blade 22 may be configured to be in operative association with corresponding cable translation devices 158. For instance, FIG. 8 illustrates an alternative embodiment to the embodiment shown in FIG. 6. As shown in FIG. 8, for each pair of support cables 152 extending from the blade root 24, one of the cables 152 may be configured to be in operative association with a corresponding translation device 158 positioned within the hub 20. In such an embodiment, each support cable 152 not associated with a translation device 158 may simply be used to provide additional support for the rotor blade 22 as it is being lowered. In addition, such support cables 152 may also be configured to be utilized in connection with the stop blocks 170 described above. For instance, as shown in FIG. 8, the stop block 170 may be positioned directly above the pitch bearing 150 to allow the stop block 170 to be engaged between one of the cable lugs 172 and the pitch bearing 150 in the event of failure of one or more of the translation devices 158 installed on any of the other support cables 152.

It should be appreciated that, in further embodiments of the present subject matter, the rotor blade 22 may be configured to be initially lowered from the hub 20 using any other suitable lowering means known in the art. For instance, as an alternative to the fluid-driven cable translation devices 158 described above, the cable translation devices may correspond to winches positioned within the hub 20. In such an embodiment, the support cables 152 may be unwound from each associated winch in order to initially lower the rotor blade 22 from the hub 20. In another embodiment, the support cables 152 may be replaced with elongated threaded rods. In such an embodiment, the threaded rods may be received within a suitable translation device (e.g., a screw jack) configured to allow the rods to be moved relative to the device, thereby allowing the rotor blade 22 to be lowered relative to the hub 20.

Referring now to FIGS. 9 and 10, another embodiment of suitable components that may be included within a lowering system to initially lower the rotor blade 22 from the hub 20 an initial vertical distance 146 is illustrated in accordance with aspects of the present subject matter. Specifically, FIG. 9 illustrates a partial perspective view of the hub 20, the rotor blade 22 and the pitch bearing 150 of the wind turbine 10 after the blade 22 has been lowered from the hub 20 by the initial vertical distance 146. FIG. 10 illustrates a partial, perspective view of the interior of the hub 20 at the interface between the rotor blade 22 and the pitch bearing 150 prior to the blade 22 being lowered relative to the hub 20.

As particularly shown in FIGS. 9 and 10, to allow the rotor blade 22 to be initially lowered, several of the root bolts 46 extending through the bolt holes 151 defined in the pitch bearing 150 may be removed. The existing barrel nuts 44 associated with such bolts 46 may then be replaced with cylindrically-shaped support nuts 300, with each support nut 300 being configured to allow a corresponding support cable 302 to be coupled to the blade root 24. For example, as shown in FIG. 9, in one embodiment, four of the existing barrel nuts 44 may be removed and replaced with suitable support nuts 300. In doing so, the remainder of the root bolts 46 may be initially maintained in engagement with the pitch bearing 150 (e.g., via suitable attachment nuts 304 (FIG. 10) to allow the rotor blade 22 to continue to be supported by the hub 20 until the rotor blade 22 is ready to be lowered.

As indicated above, in one embodiment, four support nuts 300 may be installed through the blade root 24 in place of the existing barrel nuts 44 to allow four corresponding support cables 302 to be coupled to the rotor blade 22. However, in other embodiments, any other suitable number of support nuts 300 may be secured within the blade root 24 to provide a means for coupling a corresponding number of support cables 302 to the rotor blade 22, such as by installing less than four support nuts 300 within the blade root 24 (e.g., two or three support nuts) or greater than four support nuts 300 within the blade root 24 (e.g., five, six or more support nuts).

Additionally, it should be appreciated that the support nuts 300 may be configured to be maintained in position relative to the rotor blade 22 using any suitable attachment means. For instance, in one embodiment, once a given support nut 300 is inserted within the blade root 24, a corresponding root bolt 46 may be inserted through the pitch bearing 150 and screwed into the vertically extending opening 306 of the support nut 300 in order to secure the nut 300 within the blade root 24. Alternatively, as shown in FIG. 10, an alignment pin 312 may be configured to be inserted through the pitch bearing 150 and screwed into the vertically extending opening 306 of each support nut 300. In such an embodiment, each alignment pin 312 may generally be configured for attachment within the corresponding support nut 300 in a manner similar to the existing root bolts 46 and, thus, may include a threaded end 314 for engaging the threaded opening 306 of the support nut 300. However, as shown in FIG. 10, each alignment pin 312 may define a vertical height or length 316 that is greater than the length 159 (FIG. 6) of the root bolts 46. Accordingly, the alignment pins 312 may also be utilized to align the rotor blade with pitch bearing as the rotor blade (or a different rotor blade with the alignment pins installed therein) is being lifted up onto the hub.

Referring still to FIGS. 9 and 10, each support cable 302 may be configured to extend from one of the support nuts 300 to a corresponding cable translation device 318 positioned within the hub 20. As shown in FIG. 10, in one embodiment, the cable translation device 318 may correspond to cable hoists (including chain hoists) configured to be mounted to and/or supported by any suitable wind turbine component(s) positioned within the hub 20 (e.g., the hub gusset(s), joist(s) and/or any other suitable component(s)). As is generally understood, cable hoists may be configured to allow suitable cables to be passed therethrough in a controlled manner. Thus, in the present application, such cable hoists may be utilized to safely and effectively lower the rotor blade 22 relative to the hub 20.

It should also be appreciated that, similar to the support cables 152 described above, each support cable 302 may generally correspond to any suitable elongated cable-like object that has a rated load capacity sufficient to handle the weight of the rotor blade 22. For instance, as shown in the illustrated embodiment, the support cables 302 are configured as metal chains. However, in other embodiments, the support cables 302 may correspond to steel cables or any other suitable wire ropes. Moreover, it should be appreciated that each support cable 302 may generally be configured to define any suitable length that permits the cables 302 to be utilized to lower the rotor blade 22 away from the hub 20 by the initial vertical distance 146.

Once the rotor blade 22 has been initially lowered from the hub 20, a suspension system 200 may be attached to the rotor blade 22 for further support while the pitch bearing 150 is being removed or replaced. For example, as shown in FIG. 11, one embodiment of a suitable suspension system 200 is illustrated in accordance with aspects of the present subject matter. As shown, the rotor blade 22 may be supported by corresponding support straps 214 extending around the remaining "rabbit-eared" rotor blades 22. In further embodiments, any suitable suspension system may be used in addition to the suspension system 200 illustrated herein, including for example, the suspension system described in U.S. application Ser. No. 14/706,409 entitled "Up-Tower Suspension System for a Wind Turbine Rotor Blade" filed on May 7, 2015.

Referring now to FIG. 12, after lowering the rotor blade 22 from the hub 20 by the initial distance 146 (FIG. 4) and providing additional support to the blade 22 via a suspension system 200 (if necessary), the pitch bearing 150 is removed from the hub 20, e.g. by removing the bearing bolts. The pitch bearing 150 can then be suspended in a horizontal position between the hub 20 and the blade 22, e.g. via one or more chains or cables 120. As mentioned, the horizontal position generally refers to the position of the pitch bearing 150 where a leading edge 163 of the bearing 150 has substantially the same height as a trailing edge 165 of the bearing 150. Once the pitch bearing 150 and the rotor blade 22 are detached from each other and suspended a vertical distance from the hub 20, a pulley system 110 for removing and lowering the pitch bearing 150 according to the present disclosure can be installed. More specifically, as shown in FIGS. 12-14, the pulley system 110 includes a first pulley block 112 mounted at an up-tower location of the wind turbine 10 and a second pulley block 118 configured with the pitch bearing 150. Further, the first pulley block 112 may be used to couple one or more pulley cables or cables 116 between the hub 20 and a main or first ground winch 114 supported on and/or adjacent to the support surface 14.

Referring now to FIG. 15, the pulley system 110 includes a rigging system 122 secured to the pitch bearing 150. More specifically, in certain embodiments, the rigging system 122 may include a system or configuration of ropes, cables, or similar, configured with the pitch bearing 150 so as to provide support to the pitch bearing 150 as the bearing 150 is being lifted or lowered from the hub 20. Thus, the rigging system 150 may be any suitable arrangement of ropes, cables, or similar. For example, as shown, the rigging system 122 includes a plurality of ropes extending radially from a central connection point of the bearing 150. In such an embodiment, the pulley cable 116 extends from a ground location (e.g. from ground winch 114) over the first pulley block 112 and back to the rigging system 122 of the pitch bearing 150 and is routed through the second pulley block 118 at the central connection point such that the second pulley block 118 is configured to slide along the pulley cable 116, e.g. either up or down.

Referring back to FIG. 14, the pulley system 110 may also include a cable hoist 126 configured with the rigging system 122 of the pitch bearing 150. Thus, the cable hoist 126 is configured to rotate or tilt the pitch bearing 150 between a tilted position and a horizontal position. More specifically, in particular embodiments, the cable hoist 126 may be a pendant-controlled battery operated cable hoist that is configured to adjust a length of a cable connected between the pulley cable 116 and the pitch bearing 150 so as to tilt one edge of the bearing 150 with respect to an opposite edge of the bearing 150. Further, the cable hoist may be controlled remotely, via a remote control, as a safety/operability advantage. As such, the cable hoist 126 allows the pitch bearing 150 to be lowered in a tilted position so as to maintain a safe distance from the rotor blade 22.

As mentioned, the tilted position generally refers to the position of the pitch bearing 150 where one of the edges is lower than an opposite edge. More specifically, as shown in FIGS. 13 and 14, the pitch bearing 150 is in a tilted position as the leading edge 163 of the pitch bearing 150 is lower than the trailing edge 165 of the pitch bearing 150. As mentioned, the leading edge 163 of the pitch bearing 150 generally refers to the edge that is at the forefront of movement. Thus, the leading edge as used herein can change with respect to the direction of movement. For example, as shown in FIGS. 13 and 14, the leading edge 163 of the pitch bearing 150 is the edge closest to the ground as the bearing 150 is being lowered to the ground 14.

Once the pitch bearing 150 has been tilted to an appropriate angle, the bearing 150 can be lowered from the hub 20 via the pulley system 100 to the support surface 14 of the wind turbine 10. More specifically, as shown in FIG. 14, the bearing 150 is configured to slide along the pulley cable 116 until the bearing 150 reaches a safe location, e.g. the support surface 14 or any other suitable platform. In additional embodiments, a tag line 124 may also be attached to the leading edge 163 of the pitch bearing 150 to control movement of the bearing 150 as the bearing 150 is being lowered to the ground (or to control movement during lifting of the bearing 150).

It should also be appreciated that the present disclosure is also directed to methods for installing a rotor blade 22 onto a wind turbine 10 (in addition to removing and lowering the rotor blade 22 from the hub 20). More specifically, as shown at 402 of FIG. 16, the method 400 may include installing a first pulley block at an up-tower location of the wind turbine. At 404, the method 400 includes securing a second pulley block to the pitch bearing. At 406, the method 400 includes attaching a pulley cable from a ground location over the first pulley block to the pitch bearing. At 408, the method 400 includes routing the pulley cable through the second pulley block such that the second pulley block is configured to slide along the pulley cable. At 410, the method 400 includes rotating the pitch bearing to a tilted position, wherein the tilted position includes a leading edge of the pitch bearing being higher than a trailing edge of the pitch bearing. At 412, the method 400 includes lifting the pitch bearing to a vertical height substantially equal to an opening between a hub and a rotor blade of the wind turbine. At 414, the method 400 includes rotating the pitch bearing to a substantially horizontal position. Thus, at 416, the method 400 includes inserting the pitch bearing into the opening while the pitch bearing is in the horizontal position. In another embodiment, the method 400 may also include securing the pitch bearing to the hub and securing the rotor blade to the pitch bearing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for removing a pitch bearing operatively coupled between a rotor blade and a hub of a wind turbine, the hub configured atop a tower of the wind turbine, the method comprising:
    installing a first pulley block at an up-tower location of the wind turbine;
    securing a rigging system to the pitch bearing, the rigging system of the pitch bearing comprising a cable hoist secured to a trailing edge of the pitch bearing;
    securing a second pulley block to a central connection point of the rigging system;
    routing a pulley cable from a ground location over the first pulley block to the second pulley block such that the second pulley block is configured to slide along the pulley cable;
    removing the pitch bearing from between the hub and the rotor blade in a substantially horizontal position;
    rotating the pitch bearing to a tilted position via the cable hoist, wherein the tilted position comprises a leading edge of the pitch bearing being lower than the trailing edge of the pitch beating; and,
    lowering the pitch bearing from atop the tower in the tilted position.

2. The method of claim 1, further comprising attaching the pulley cable to a ground winch at the ground location.

3. The method of claim 1, further comprising attaching a tag line to the leading edge of the pitch bearing to control the pitch bearing during lowering.

4. The method of claim 1, further comprising positioning the pitch bearing and the rotor blade in a substantially six o'clock position.

5. The method of claim 4, further comprising:
    separating the rotor blade from the pitch bearing, and
    lowering the rotor blade an initial vertical distance from the hub before attaching the first pulley block.

6. The method of claim 1, wherein the cable hoist is configured to rotate the pitch bearing between the tilted position and the horizontal position.

7. The method of claim 6, wherein the cable hoist comprises a battery-operated cable hoist that is configured to adjust a length of a cable connected between the pulley cable and the pitch bearing so as to tilt one edge of the pitch bearing with respect to an opposite edge of the pitch bearing.

8. The method of claim 6, further comprising controlling the cable hoist via a remote control.

9. A method for installing a pitch bearing of a wind turbine; the method comprising:
    installing a first pulley block at an up-tower location of the wind turbine;
    securing a rigging system to the pitch bearing, the rigging system of the pitch bearing comprising a cable hoist secured to a trailing edge of the pitch bearing;
    securing a second pulley block to a central connection point of the rigging system;
    attaching a pulley cable from a ground location over the first pulley block to the pitch bearing the second pulley block such that the second pulley block is configured to slide along the pulley cable;
    rotating the pitch bearing to a tilted position via the cable hoist, wherein the tilted position comprises a leading edge of the pitch bearing being higher than the trailing edge of the pitch bearing;
    lifting the pitch bearing to a vertical height substantially equal to an opening between a hub and a rotor blade of the wind turbine;
    rotating the pitch bearing to a substantially horizontal position; and,
    inserting the pitch bearing into the opening.

10. The method of claim 9, further comprising positioning the rotor blade in a substantially six o'clock position before lifting the pitch bearing.

11. The method of claim 9, further comprising securing the pitch bearing to the hub and securing the rotor blade to the pitch bearing.

12. The method of claim 9, further comprising attaching the pulley cable to a ground winch at the ground location.

13. The method of claim 9, wherein the cable hoist is configured to rotate the pitch bearing between the tilted position and the horizontal position.

14. The method of claim 13, wherein the cable hoist comprises a battery-operated cable hoist that is configured to adjust a length of a cable connected between the pulley cable and the pitch bearing so as to tilt one edge of the pitch bearing with respect to an opposite edge of the pitch bearing.

15. The method of claim 13, further comprising controlling the cable hoist via a remote control.

16. A pulley system for removing or installing a pitch bearing of a wind turbine, the pulley system comprising:
    a first pulley block located at an up-tower location of the wind turbine;
    a rigging system secured to the pitch bearing;
    a second pulley block secured to a central connection point of the rigging system of the pitch bearing;
    a pulley cable extending from a ground location over the first pulley block to the rigging system of the pitch bearing and routed through the second pulley block such that the second pulley block is configured to slide along the pulley cable; and,
    a cable hoist configured with the rigging system of the pitch bearing and secured to a trailing edge of the pitch bearing, the cable hoist configured to rotate the pitch bearing between a tilted position and a horizontal position, wherein the pulley system is configured to lift or lower the pitch bearing between a support surface of the wind turbine and a vertical height substantially equal to an opening between a hub and a rotor blade of the wind turbine.

17. The pulley system of claim 16, wherein the ground location comprises a ground winch.

18. The pulley system of claim 16, further comprising a tag line configured with the pitch bearing so as to control the pitch bearing during removing or installing.

\* \* \* \* \*

UNITED STATES PATENT AND TRADEMARK OFFICE
CERTIFICATE OF CORRECTION

PATENT NO. : 9,821,417 B2  
APPLICATION NO. : 14/706458  
DATED : November 21, 2017  
INVENTOR(S) : Ulrich Werner Neumann et al.

Page 1 of 1

It is certified that error appears in the above-identified patent and that said Letters Patent is hereby corrected as shown below:

In the Claims

Claim 9 (Column 14, Line 22):
-- first pulley block to the pitch bearing the second pulley -- should read -- first pulley block to the second pulley --

Signed and Sealed this
Twenty-fourth Day of July, 2018

Andrei Iancu
*Director of the United States Patent and Trademark Office*